3,186,973
PROCESS FOR THE POLYMERIZATION OF STRONGLY BASIC COMPOUNDS USING 1,2-DICHLOROETHANE AS SOLVENT
Arthur Maeder, Therwil, Switzerland, assignor to Ciba Limited, Basel, Switzerland, a Swiss firm
No Drawing. Filed Apr. 22, 1960, Ser. No. 23,925
Claims priority, application Switzerland, Feb. 27, 1958, 56,371; June 2, 1958, 60,134
6 Claims. (Cl. 260—80.3)

This application is a continuation-in-part of my application Serial No. 794,830, filed February 24, 1959 (abandoned since the filing of the present application).

It is known to polymerize strongly basic monomers having a pK base value of less than 6 and which contain a polymerizable carbon-to-carbon double bond and a basic tertiary amino group. Examples are acrylic acid or methacrylic acid dialkylamino-alkyl esters or dialkylamino-alkylamides of these acids, or the corresponding functional derivatives of maleic or fumaric acid, or other compounds containing polymerizable vinyl groups and strongly basic tertiary amino groups, such as dialkylamino-alkyl (for example dialkylaminopropyl) vinyl ethers.

The polymerization of such strongly basic compounds in solution in an organic solvent, i.e., in a non-aqueous system, generally leads to very poor yields as compared with those obtained with compounds free from basic groups or having only weakly basic properties, that is to say having a pK base value of more than about 6.

Surprisingly it has been found that the aforesaid strongly basic monomers, having a basicity expressed by a pK base value of less than 6, can be practically quantitatively polymerized alone with the aid of a catalyst, or copolymerized also with the aid of a catalyst, in a very simple and advantageous manner by carrying out the polymerization or copolymerization in 1:2-dichlorethane.

Accordingly, the present invention provides a process for the manufacture of linear additively combined basic polymers which comprises polymerizing at least one polymerizable monoethylenically unsaturated strongly basic compound having a pK base value of less than 6 and containing 1 to 2 basic tertiary amino groups, each separated from the polymerizable ethylene group by a chain of 1 to 8 atoms, in solution in 1:2-dichlorethane and in the presence of a polymerization catalyst selected from the group of peroxidic catalysts and free radical catalysts, which is soluble in 1:2-dichlorethane, at elevated temperatures, with the proviso that copolymerization with acrylonitrile is effected with an amount of at most 60 percent by weight of acrylonitrile, calculated on the total weight of the polymerizable compounds.

The stipulation that the basic tertiary amino groups must be separated from the unsaturated carbon-to-carbon bond by a chain of 1 to 8 and preferably 1 to 5 atoms, excludes compounds containing the ethylene group directly attached to the basic nitrogen atom. The atoms of the chain may be carbon, nitrogen or oxygen and of the carbon atoms of a 6-membered carbocyclic system only four carbon atoms are regarded as being members of the chain.

The expression "polymerizable mono-ethylenically unsaturated compound" denotes a compound which contains the vinylene group —CH=CH—, the vinyl group $CH_2$=CH— or the vinylidene group $CH_2$=C<, advantageously the grouping

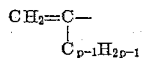

in which $p$ represents the whole number 1 or 2, and which compounds are polymerizable alone (homopolymerizable) and copolymerizable, and also those that are only copolymerizable. The expression "basic polymers" encompasses homopolymers and copolymers obtained by linear additive polymerization of at least one of the polymerizable monoethylenically unsaturated strongly basic monomers defined above.

Polymerizable strongly basic compounds, as defined above, containing one or two tertiary amino groups, and having a pK base value of less than 6 may belong to the following classes of compounds:

(a) Basic amides of $\alpha:\beta$-monoethylenically unsaturated aliphatic carboxylic acids containing 3 to 5 carbon atoms, which amides contain in the amide portion of the molecule 1 to 2 tertiary amino groups separated from the amide nitrogen atom by a divalent hydrocarbon radical containing 2 to 6 carbon atoms, (b) Basic esters of $\alpha:\beta$-monoethylenically unsaturated aliphatic carboxylic acids containing 3 to 5 carbon atoms, which esters contain in the ester portion of the molecule 1 to 2 tertiary amino groups separated from the ester oxygen atom by a divalent hydrocarbon radical containing 2 to 6 carbon atoms, (c) Basic vinyl-ethers containing one tertiary amino group and one atomic grouping $CH_2$=CH—O— which is bound to a divalent alkylene group containing 1–3 carbon atoms, (d) Allylamines in which the amino group is present as a basic tertiary amino group.

Compounds of the class (a) and (b) are especially suitable for use in the process of this invention. In these classes of compounds there are especially suitable for homopolymerization, provided that the monomers are homopolymerizable, and also for copolymerization basic amides and basic esters of polymerizable $\alpha:\beta$-unsaturated aliphatic monocarboxylic acids, which contain a single

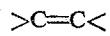

group and a tertiary amino group in the amide or ester portion of the molecule, the tertiary nitrogen atom being linked with the amide nitrogen or the ester oxygen atom by a divalent hydrocarbon radical containing 2 to 6 carbon atoms. These basic amides and esters are derivatives of polymerizable or copolymerizable monocarboxylic acids, containing 3 to 4 carbon atoms, such as crotonic acid, or $\alpha$-chloracrylic acid, and especially methacrylic acid or acrylic acid, that is to say, acids of the formula (1) 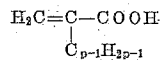

in which $p$ is the whole number 1 or 2.

These amides and esters are advantageously those of the general formula (2) 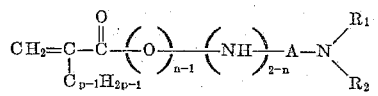

in which $p$ represents the whole number 1 or 2, $n$ represents the whole number 1 or 2, A represents a hydrocarbon radical constituting a bridge of at least two carbon atoms between the hetero atoms, and $R_1$ and $R_2$ represent hydrocarbon radicals or 1–6 carbon atoms, which may be substituted by hydroxy groups or which may be connected together to form a heterocyclic ring. When $n$ in the above formula is 1, the formula represents an amide of a copolymerizable acid, and when $n$ is 2, the formula represents a corresponding ester. The hydrocarbon radical A advantageously contains 2 to 6 carbon atoms, and it may be aliphatic or carbocyclic. For example, there may be mentioned the residues

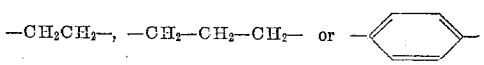

As examples of basic amides of the formula (2) there may be mentioned:

Acrylic acid-γ-diethylamino-propylamide, pK=4.0,
Further methacrylic acid γ-dimethylamino-propylamide,
Acrylic acid γ-di-(hydroxyethyl)-amino-propylamide,
Methacrylic acid β-diethylamino-ethylamide,
Acrylic acid β-dimethylamino-ethylamide,
Methacrylic acid (4-dimethylamino-cyclohexyl)-amide,
Acrylic acid (4-dimethylamino-phenyl)-amide, and
Acrylic acid β-N-morpholine-ethylamide, and
Acrylic acid β-pyrrolidino-ethylamide.

As examples of basic esters of the Formula 2 there may be mentioned:

Acrylic acid β-diethylamino-ethyl ester, pK=5.0,
Methacrylic acid β-dimethylamino-ethyl ester, pK=5.7,
Methacrylic acid β-diethylamino-ethylester, pK=5.2,
Further acrylic acid β-dimethylamino-ethyl ester,
Methacrylic acid γ-diethylamino-propyl ester,
Acrylic acid γ-di-(2-cyanoethyl)-aminopropyl ester,
Acrylic acid γ-di-n-butylamino-propyl ester,
Acrylic acid γ-diphenylaminopropyl ester, and
Acrylic acid (4-diethylaminophenyl)-ester.

Any desired diamines may be used for making the aforesaid amides, provided that the diamines contain a tertiary and an at most secondary amino group, imparting to the monomer a pK base value of less than 6. There may be mentioned for example, α-amino-β-diethylamino-ethane, α-amino-γ-diethylaminopropane, and also diamines which contain an aliphatic hydrocarbon radical of high molecular weight such as are obtainable by the additive combination of secondary monoamines of high molecular weight with acrylonitrile followed by reduction.

For making the aforesaid esters there may be used compounds which contain an esterifiable group (hydroxyl group) and a tertiary amino group imparting to the monomer a pK base value of less than 6, for example, tertiary alkanolamines, such as triethanolamine, dimethyl- or diethyl- or dibutyl-ethanolamine, dimethyl- or diethyl-propanolamine, N - methyl-N-octadecylamino-propanol-amine or heterocyclic compounds such as hydroxyethyl-morpholine, and also dimethylamino-hydroxybenzene.

As further compounds of the class (a) and (b) there may be mentioned basic amides or esters of α:β-unsaturated aliphatic dicarboxylic acids which contain a single >C=C< group and 5 or preferably 4 carbon atoms and contain in the amide or ester portion of the molecule one or preferably two tertiary amino-groups linked with the amide nitrogen atom or the ester oxygen atom by a divalent hydrocarbon radical of 2 to 6 carbon atoms. These compounds are less suitable for homopolymerization, but are of advantage for copolymerization. As unsaturated dicarboxylic acids there may be mentioned maleic acid, itaconic acid and especially fumaric acid. Examples of such basic amides or esters are maleic acid γ-dimethyl-amino-propylamide, fumaric acid di-[γ-dimethylamino-propyl]-amide and fumaric acid di-[β-diethylaminoethyl] ester.

As examples of compounds of the class (c) there may be mentioned basic vinyl ethers having a pK base value of less than 6 and containing one tertiary amino group, the H₂C=CH—O— group of which is bound to an alkylene radical of 1 to 3 carbon atoms, for example, those containing only aliphatic radicals, or those containing in addition to an aliphatic radical, only heterocyclic or only an aromatic radical containing only one ring, namely one 6-membered ring. As examples there may be mentioned β-dimethyl-aminoethyl vinyl ether (pK=5.1), β-di-n-butylaminoethyl vinyl ether, β-morpholinopropyl vinyl ether and 4-dimethylaminophenyl-(1)-methyl vinyl ether.

As compounds of class (d) there may be mentioned more especially N:N-dimethyl-allylamine (pK=4.6) and N:N-diethylallylamine, i.e., allylamines in which the amino group is a tertiary amino group.

The compounds of the classes (a), (b) and (c) preferably used correspond to the general Formula 3

(3) 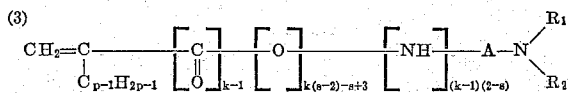

wherein $k$, $s$ and $p$ each represent an integer from 1 to 2, A represents a hydrocarbon radical containing 2 to 6 carbon atoms, $R_1$ and $R_2$ taken singly are organic radicals containing 1 to 6 carbon atoms, and $R_1$ and $R_2$ taken jointly form a heterocyclic radical with the N atom, which heterocyclic radical contains 1 to 2 basic nitrogen atoms.

When $R_1$ and $R_2$ are taken singly, they represent preferably hydrocarbon radicals having 1–6, and advantageously 1–2, carbon atoms, or hydrocarbon radicals substituted by hydroxyl groups having 1–4, and preferably 1–2, carbon atoms.

When $k=2$ and $s=1$ the Formula 3 stands for an amide of the formula (4) 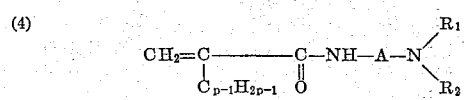

When $k=2$ and $s=2$ the Formula 3 stands for an ester of the formula (5) 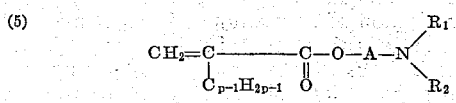

When $k=1$ the Formula 3 stands for an ether of the formula (6) 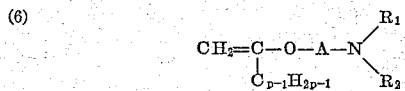

The statement in Formulae 2 and 3 that the radicals $R_1$ and $R_2$ taken jointly form a heterocyclic radical with the N atom means that compounds with a tertiary amino group of the formula

or of the formula

come into consideration, the ring which is advantageously saturated being preferably bound to the polymerizable —CH=C< group through a carbon bridge and a hetero atom. As an example there may be mentioned acrylic acid -β-N-morpholinoethyl amide.

When a copolymerization is to be carried out by the process of the invention, two or more different compounds may be used which have the constitution hereinbefore defined or at least one compound of that kind and one or more other copolymerizable compounds having no basic tertiary amino group may be used. As such compounds there may be mentioned more especially singly ethylenically unsaturated polymerizable compounds, which likewise contain a CH₂=C< group, and especially a

group in which $q$ represents the whole number 1 or 2, such as vinyl esters of organic acids, for example, vinyl acetate, vinyl formate, vinyl butyrate, vinyl benzoate, vinyl alkyl ketones, vinyl halides such as vinyl chloride, vinyl fluoride or vinylidene chloride, or vinyl-aryl compounds such as styrene and substituted styrenes, and also compounds of the acrylic acid series, such as esters of acrylic acid with alcohols or phenols that are free from tertiary amino groups, for example, ethyl acrylate, butyl acrylate, dodecyl acrylate, or acrylonitrile, which must be used in a proportion not exceeding 60 percent calculated on the total weight of the monomers used, or acrylic acid amide and advantageously derivatives thereof substituted at the amide nitrogen, such as dihydroxyethyl-acrylic acid amide, N-tertiary butyl-acrylic acid amide and hexamethylol-melamine-triacrylic acid amide, and also analogous derivatives of methacrylic acid, α-chloracrylic acid, crotonic acid, maleic acid or fumaric acid. There may also be used polymerizable olefines such as isobutylene, butadiene or 2-chlorobutadiene. There are advantageously used derivatives of acrylic acid or methacrylic acid, which are free from basic tertiary nitrogen atoms, and among these derivatives especially the esters with aliphatic alcohols or the N- monosubstituted amides, in which an aliphatic substituent is bound to the amide nitrogen atom by a tertiary carbon atom.

As a rule, the basic compound containing a tertiary amino group is used in a proportion ranging from 2 to 98, and preferably from 10 to 90, percent on the total weight of the polymerizable compounds. The polymerizable compound free from teritiary amino groups is used in a proportion ranging from 2 to 98, and preferably from 10 to 90, percent by weight.

The polymerization catalysts used are those soluble in 1:2-dichlorethane and are of the free radical acting type, for example, such as acetyl peroxide, benzoyl peroxide, benzoylacetyl peroxide, lauryl peroxide, cumene hydroperoxide, tertiary butyl hydroperoxide, para-methane hydroperoxide, α:α′-azo-diisobutyronitrile or α:α-azo-bis-(isobutyramidine hydrochloride). The proportion of catalyst added depends in known manner on the course of the reaction desired or on the desired properties of the polymer. If desired, more than one polymerization catalyst may be used. The action of the polymerization catalysts can be increased by the application of heat. To influence the speed of the polymerization and the molecular weight of the polymer obtained, so-called regulators such, for example, as mercaptans, terpenes or similar compounds, may be added. Furthermore, it is of advantage to carry out the polymerization in the absence of air or oxygen. The action of the polymerization catalyst can also be accelerated by the use of an activator.

The polymerization may be carried out at the ordinary temperature, but it is preferable to work at a raised temperature, for example at 40° C. to 95° C., and preferably 65° C. to 80° C. The polymerizations are often attended by the liberation of a considerable amount of heat, so that suitable cooling means must be provided to maintain the desired polymerization temperature. This is especially necessary when a large batch is to be polymerized. In order to utilize the liberated heat and to control the polymerization temperature easily, it is sometimes of advantage initially to introduce into the polymerization apparatus only part of the total batch and to allow the polymerization to commence in that part. When this part of the solution has reached a certain temperature, for example, 60 to 70° C., the remainder of the cold solution is run in in such manner that the temperature is kept constant. Towards the end of the polymerization it is often necessary to supply external heat.

As a rule, the proportion of polymerizable compounds used ranges from 5 to 60, preferably from 30 to 50 percent of the weight of 1:2-dichlorethane used.

Depending on the polymerization conditions and starting materials used the polymers are obtained in the form of viscous solutions or of granulates. It is often possible to use the product resulting from the polymerization without working it up, but it is often preferable first to work it up in a suitable manner. For example, modifiers, such as plasticizers, for example, dibutyl or dioctyl phthalate or a sebacic acid ester, or organic or inorganic pigments or fillers may be added. The 1:2-dichlorethane used as solvent may be distilled off, whereby solvent-free polymers or copolymers are obtained which, if desired may be neutralized with acid and may be soluble or dispersible in water.

The homopolymers or copolymers obtained by the present process are useful for a very wide variety of purposes. Quite generally, they may be used for any purpose for which a polymerization or condensation resin is suitable. Provided they have been made from appropriate starting materials, the products can be used, inter alia, as assistants in the manufacture of textiles, leather or paper. They may be used for the preparation of impregnating liquors and coating compositions. Thus, for example, textile materials of synthetic fibers, such as acetate rayon, polyamide fibers (nylon) or polyacrylonitrile fibers (Orlon) can be provided with an antistatic dressing with suitably substituted compounds. Some polymers are also suitable as after-treating agents for improving the fastness to washing and water of dyeings and prints produced on cellulosic textile materials with water-soluble direct dyestuffs whose solubility in water is due to the presence of sulfonic acid groups or carboxyl groups. Such an aftertreatment may be combined with a treatment with a copper salt.

The polymers obtained by the present process may be used above all as fixing agents for soluble dyestuffs in photographic film emulsions, as binding agents for pigments, for animalizing fibers, as binding agents for waxes and oils on paper and leather, as acid acceptors, as cationic precipitants, as stabilizers for chlorine-containing polymers, in the form of the fluorosilicates as anti-moth agents, as thickening, emulsifying and sizing agents, and as adhesives. Furthermore, they are suitable for incorporation with hair setting lotions, more epsecially those in the form of aerosol sprays and with skin protecting creams. A particularly valuable sphere of application of the polymers of the invention is their use as hardeners for epoxy resins.

The polymer solutions obtained by the present process are particularly suitable for use in combination with aminoplasts soluble in organic solvents, particularly such as alkyl ethers of urea-formaldehyde condensation products and preferably melamine-formaldehyde condensation products. These alkyl ethers contain advantageously several carbon atoms in thealkyl radical, such as the ethyl, propyl and butyl ethers. The polymer solution according to the invention and the aminoplast may be used separately, but it is of advantage to make up the constituents into preparations that can be used for a variety of purposes in the manufacture of textile materials, paper or leather. When such a preparation is used for coating purposes—for example in the manufacture of so-called oil silk—it is of advantage to incorporate with it additionally a wax-like substance soluble in 1:2-dichlorethane, more especially chlorinated paraffin wax.

Unless otherwise indicated, parts and percentages in the following examples are by weight.

*Example 1*

A solution of 30 parts of N:N-diethylaminopropyl-acrylamide, 30 parts of N:N-dibutylaminoethyl vinyl ether and 90 parts of 1:2-dichlorethane is heated in a stirring flask equipped with reflux condenser and thermometer under nitrogen to an internal temperature of 75° C., whereupon 0.05 part each of lauroyl peroxide and of α:α′-azodiisobutyronitrile are added. The temperature rises by 18° C. within a few minutes and then drops again to about 85° C. An equal amount of catalyst is added five more times at intervals of 3 hours each and then every 3 hours another 6 additions are made of 0.1 part of α:α′-azodiisobutyronitrile each. 6 hours after the last addition of catalyst the whole is cooled to room temperature.

An almost clear, medium viscous, brownish solution is obtained. The yield of polymer is about 72% of theory, the resin dry content being about 30%.

The resin gives a practically clear, almost colorless film which is only very slightly tacky.

Example 2

15 parts of N:N-diethylamino ethyl crotonate are neutralized with 4.87 parts of acetic acid of 100% strength and diluted with 150 parts of 1:2-dichlorothane. 45 parts of N-tertiary butyl acrylamide and 40 parts of ethyl acrylate are added, and the mixture is heated in a stirring flask equipped with reflux condenser and thermometer under nitrogen to an internal temperature of about 70 to 73° C., whereupon 0.05 part each of lauroyl peroxide and of $\alpha:\alpha'$-azodiisobutyronitrile are added. After 15 minutes the temperature has risen by 11° C. and then slowly drops again to the initial temperature. When this point is reached, another 0.05 part each of lauroyl peroxide and of $\alpha:\alpha'$-azodiisobutyronitrile are added, and this addition is repeated another 8 times at intervals of 2 hours each. 2 hours after the last addition of catalyst the whole is cooled to room temperature.

A clear, dark red, thinly viscous solution is obtained. On addition of water, the resin precipitates spontaneously. The polymer yield is about 92%, the dry content 38 to 40%.

5 parts of the resin solution of a resin content of about 40% described above are diluted with 15 parts of absolute alcohol and cooled to −5 to −10° C. The solution is poured into an aerosol dispenser, 30 parts of a 1:1 mixture of monofluoro-trichloromethane and dichloro-difluoromethane are added, and the container is closed with a special hair spray valve.

Hair sprayed with this aerosol hair lotion has a fine lustre, is easy to dress and has no electrostatic charge. A simple hair wash will remove the lotion from the hair.

Example 3

A mixture of 36 parts of N-tertiary butyl acrylamide, 36 parts of vinylidene chloride, 18 parts of N-($\gamma$-diethylaminopropyl)-acrylamide and 210 parts of 1:2-dichlorethane is heated in a stirring flask equipped with a gas-tight stopper, reflux condenser and thermometer to an internal temperature of 40° C., whereupon 0.09 part of $\alpha:\alpha'$-azodiisobutyronitrile is added. Four additions of 0.09 part of $\alpha:\alpha'$-azodiisobutyronitrile are then made to intervals of 1 hour each. 1 hour after the last addition of catalyst the internal temperature is raised by 5° C., and this increase is repeated every 2 hours until an internal temperature of 65° C. has been reached; 2 hours later the whole is cooled to room temperature. During the phased raising of the temperature ten further hourly additions of 0.09 part of $\alpha:\alpha'$-azodiisobutyronitrile each are made.

A gelatinous, highly viscous, reddish brown solution is obtained which can be diluted with alcohol or 1:2-dichlorethane in any desired proportion. The yield of polymer is about 95% of theory, its resin dry content is 29 to 30%.

Example 4

A mixture of 36 parts of N-tertiary butyl acrylamide, 36 parts of styrene, 18 parts of N-($\gamma$-diethylaminopropyl)-acrylamide and 210 parts of 1:2-dichlorethane is heated in a stirring flask equipped with reflux condenser and thermometer to an internal temperature of 70° C., whereupon 0.09 part of $\alpha:\alpha'$-azodiisobutyronitrile is added. 14 more additions of the same amount of catalyst are made at intervals of 1 hour each, and 1 hour after the last addition the whole is cooled to room temperature.

A thinly viscous, red solution is obtained which can be diluted with alcohol or 1:2-dichlorethane in any desired proportion. The yield of polymer is about 94% of theory, its resin dry content is about 29 to 30%.

Example 5

One-half of a solution of 24 parts of acrylonitrile and 16 parts of N:N-diethylaminopropyl arcrylamide in 60 parts of 1:2-dichlorethane is heated in a stirring flask equipped with reflux condenser and thermometer to an internal temperature of 70° C., whereupon 0.5 part each of lauroyl peroxide and of $\alpha:\alpha'$-azodiisobutyronitrile are added. After 10 minutes, the dropwise addition of the remainder of the above monomer solution is begun. After 45 minutes the dropwise addition is complete, another 0.05 part each of lauroyl peroxide and of $\alpha:\alpha'$-azodiisobutyronitrile are added, and two more additions of an equal amount of catalyst are made at intervals of 2 hours each. 2 hours after the last addition of catalyst the whole is cooled to room temperature.

A medium viscous, dark red solution of clear appearance is obtained. The polymer yield amounts to about 86% of theory.

Example 6

A solution of 20 parts of acrylonitrile and 20 parts of N:N-diethylaminopropyl methacrylamine in 60 parts of 1:2-dichlorethane is polymerized as described in Example 1.

A clear, dark red solution of low viscosity results. The yield of polymer amounts to about 79% of theory.

4 parts of the above resin solution of about 35% dry content are mixed with 0.3 part of a polyglycidyl ether from 1:4-butanediol and epichlorohydrin containing 7.5 expoxide equivalents per kg.

A film made from this mixture is hardened for 15 minutes at 90° C. and then for 10 minutes at 130° C.

A brownish yellow, plastic resin is obtained which is almost insoluble in boiling acetone.

Example 7

One-half of a solution of 40 parts of N:N-diethylaminopropyl acrylamide in 60 parts of 1:2-dichlorethane is heated in a stirring flask equipped with reflux condenser and thermometer to an internal temperature of 75° C., whereupon 0.1 part of $\alpha:\alpha'$-azo-diisobutyronitrile is added. After 10 minutes the temperature rises by about 5° C., whereupon the remainder of the solution described above is added dropwise within 30 minutes. 5 minutes after completion of the dropwise addition another 0.1 part of $\alpha:\alpha'$-azodiisobutyronitrile is added and the same amount is added twice more at intervals of 2 hours each. 2 hours after the last addition of catalyst the whole is cooled to room temperature.

A clear, yellow resin solution of low viscosity is obtained. The yield of polymer is about 95% of theory.

Example 8

One-half of a solution of 28 parts of N:N-diethylaminopropyl acrylamide and 12 parts of methylvinyl ketone in 60 parts of 1:2-dichlorethane is heated in a stirring flask equipped with reflux condenser and thermometer to an internal temperature of 75° C., whereupon 0.1 part of $\alpha:\alpha'$-azodiisobutyronitrile is added. After 10 minutes a moderate temperature rise of about 2° C. takes place, and within 30 minutes the remainder of the above solution is added dropwise. 5 minutes after completion of the dropwise addition another 0.1 part of $\alpha:\alpha'$-azodiisobutyronitrile is added, and the same amount is added twice more at intervals of 2 hours each. After a further 2 hours 0.2 part of lauroyl peroxide is added and the same amount is added once more 8 hours later, and after another 8 hours the whole is cooled to room temperature.

A dark brown solution of low viscosity is obtained. The yield of polymer is about 86% of theory.

4 parts of the resin solution of about 35% dry content described above are mixed with 0.3 part of polyglycidyl ether from 1:4-butanediol and epichlorohydrin containing 7.5 epoxide equivalents per kg.

A film made from this mixture is hardened for 15 minutes at 90° C. and then for 10 minutes at 130° C.

A yellow, plastic resin is obtained which is substantially insoluble in boiling acetone.

Example 9

A solution of 4 parts of N:N-diethylaminoethyl acrylate and 36 parts of N:N-diethylaminopropyl acrylamide in 60 parts of 1:2-dichlorethane is polymerized as described in Example 8.

A clear, yellow solution of low viscosity is obtained. The yield of polymer is almost 100% of theory.

*Example 10*

In a stirring autoclave of 1000 parts by volume capacity a solution of 72 parts of butadiene, 36 parts of acrylonitrile and 12 parts of para-dimethylaminophenyl acrylamide in 180 parts of 1:2-dichlorethane is heated in the presence of 0.6 part of lauroyl peroxide and 1.5 parts of methylethyl ketone peroxide (toluenic solution of about 40% strength) to an external temperature of 80° C. The initial pressure is 4.5 atmospheres (gauge). After 24 hours' polymerization at a constant external temperature, the pressure has dropped to 3.1 atmospheres (gauge) and remains constant. The mixture is then cooled to room temperature.

A dark-colored solution of low viscosity is obtained. The yield of polymer is 33 to 34% of theory.

*Example 11*

One-half of a solution of 2 parts of N:N-diethylaminopropyl acrylamide, 14 parts of n-butyl acrylate and 24 parts of vinyl acetate in 60 parts of 1:2-dichlorethane is heated in a stirring flask equipped with reflux condenser and thermometer to an internal temperature of 75° C., whereupon 0.05 part each of lauroyl peroxide and of α:α'-azodiisobutyronitrile are added. After 10 minutes the dropwise addition of the remainder of the above monomer solution is begun. After 30 minutes the dropwise addition is complete; another 0.05 part of each of lauroyl peroxide and of α:α'-azodiisobutyronitrile are added, and this addition is repeated twice more at intervals of 2 hours each. 2 hours after the last catalyst addition the whole is cooled to room temperature.

A clear, yellow solution of syrupy consistency is obtained. The yield of polymer is about 75% of theory.

*Example 12*

A solution of 24 parts of acrylonitrile and 16 parts of N:N-diethylaminoethyl methacrylate in 60 parts of 1:2-dichlorethane is polymerized as described in Example 14, except that 2 hours after the last catalyst addition another 1 part of a toluenic solution of methylethyl ketone peroxide of 40% strength is added. The mixture is polymerized for a further 12 hours and then cooled to room temperature.

A clear, yellow, thinly viscous solution is obtained. The yield of polymer is about 55% of theory.

What is claimed is:

1. A process for the manufacture of linear additively combined basic polymers which comprises polymerizing (1) a basic polymerizable compound having a pK base value of less than 6 and corresponding to the formula

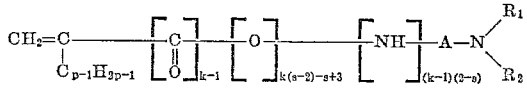

wherein $k$, $s$ and $p$ each represent an integer from 1 to 2, A represents a saturated hydrocarbon radical of 2 to 6 carbon atoms, $R_1$ and $R_2$ taken singly are hydrocarbon radicals of 1 to 6 carbon atoms, and $R_1$ and $R_2$ taken jointly form a heterocyclic radical with the N atom which heterocyclic radical contains 1 to 2 basic nitrogen atoms, and (2) a different ethylenically unsaturated compound, in solution in 1:2-dichlorethane and in the presence of a free radical acting catalyst, which is soluble in 1:2-dichlorethane, at temperatures between 40 to 95° C., the total amount of polymerizable compounds being 5 to 60 percent by weight calculated on the quantity of 1:2-dichloroethane the basic polymerizable compound being present in a major amount of the total amount of the polymerizable compounds.

2. A process for the manufacture of additively combined basic polymers which comprises polymerizing (1) a basic polymerizable compound having a pK base value of less than 6 and corresponding to the formula $$CH_2=C-\overset{O}{\underset{\underset{C_{p-1}H_{2p-1}}{|}}{C}}-(O)_{v-1}-(NH)_{2-v}-A-N\overset{R_1}{\underset{R_2}{\diagdown}}$$

wherein $p$ and $v$ each represent an integer from 1 to 2, A represents a saturated hydrocarbon radical of 2 to 6 carbon atoms, $R_1$ and $R_2$ taken singly are hydrocarbon radicals of 1 to 6 carbon atoms, and $R_1$ and $R_2$ taken jointly form a heterocyclic radical with the N atom, which heterocyclic radical contains 1 to 2 basic nitrogen atoms, and (2) a different ethylenically unsaturated compound, in solution in 1:2-dichlorethane and in the presence of a free radical acting catalyst, which is soluble in 1:2-dichlorethane, at temperatures between 40 to 95° C., the total amount of polymerizable compounds being 5 to 60 percent by weight calculated on the quantity of 1:2-dichlorethane the basic polymerizable compound being present in a major amount of the total amount of the polymerizable compounds.

3. A process for the manufacture of linear additively combined basic polymers which comprises polymerizing (1) a basic polymerizable compound having a pK base value of less than 6 and corresponding to the formula $$CH_2=C-\overset{O}{\underset{\underset{C_{p-1}H_{2p-1}}{|}}{C}}-O-A-N\overset{R_1}{\underset{R_2}{\diagdown}}$$

wherein $p$ represents an integer from 1 to 2, A represents a saturated hydrocarbon radical of 2 to 6 carbon atoms, $R_1$ and $R_2$ taken singly are hydrocarbon radicals of 1 to 6 carbon atoms, and $R_1$ and $R_2$ taken jointly form a heterocyclic radical with the N atom, which heterocyclic radical contains 1 to 2 basic nitrogen atoms, and (2) a different ethylenically unsaturated compound, in solution in 1:2-dichlorethane and in the presence of a free radical acting catalyst, which is soluble in 1:2-dichlorethane, at temperatures between 40 to 95° C., the total amount of polymerizable compounds being 5 to 60 percent by weight calculated on the quantity of 1:2-dichlorethane the basic polymerizable compound being present in a major amount of the total amount of the polymerizable compounds.

4. A process for the manufacture of linear additively combined basic polymers which comprises polymerizing (1) a basic polymerizable compound having a pK base value of less than 6 and corresponding to the formula $$CH_2=C-\overset{O}{\underset{\underset{C_{p-1}H_{2p-1}}{|}}{C}}-NH-A-N\overset{R_1}{\underset{R_2}{\diagdown}}$$

wherein $p$ represents an integer from 1 to 2, A represents a saturated hydrocarbon radical of 2 to 6 carbon atoms, $R_1$ and $R_2$ taken singly are hydrocarbon radicals of 1 to 6 carbon atoms, and $R_1$ and $R_2$ taken jointly form a heterocyclic radical with the N atom, which heterocyclic radical contains 1 to 2 basic nitrogen atoms, and (2) a different ethylenically unsaturated compound, in solution in 1:2-dichlorethane and in the presence of a free radical acting catalyst, which is soluble in 1:2-dichlorethane, at temperatures between 40 to 95° C., the total amount of polymerizable compounds being 5 to 60 percent by weight calculated on the quantity of 1:2-dichlorethane the basic polymerizable compound being present in a major amount of the total amount of the polymerizable compounds.

5. A process for the manufacture of linear additively combined basic polymers which comprises polymerizing the compound of the formula $$CH_2=CH-\overset{O}{\overset{\|}{C}}-NH-CH_2-CH_2-CH_2-N\overset{C_2H_5}{\underset{C_2H_5}{\diagdown}}$$

and a different ethylenically unsaturated compound, in solution in 1:2-dichlorethane and in the presence of a free radical acting catalyst, which is soluble in 1:2-dichlorethane at temperatures between 40 to 95° C., the total amount of polymerizable compounds being 5 to 60 percent by weight calculated on the quantity of 1:2-dichlorethane the basic polymerizable compound being present in a major amount of the total amount of the polymerizable compounds.

6. In a process for the manufacture of linear additively combined basic polymers which comprises polymerizing (1) a basic polymerizable compound having a pK base value of less than 6 and corresponding to the formula

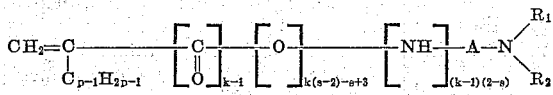

wherein $k$, $s$ and $p$ each represent an integer from 1 to 2, A represents a saturated hydrocarbon radical of 2 to 6 carbon atoms, $R_1$ and $R_2$ taken singly are hydrocarbon radicals of 1 to 6 carbon atoms, and $R_1$ and $R_2$ taken jointly form a heterocyclic radical with the N atom which heterocyclic radical contains 1 to 2 basic nitrogen atoms, and (2) a different ethylenically unsaturated compound, in the presence of a free radical acting catalyst, which is soluble in 1:2-dichlorethane, the improvement which consists in polymerizing the basic compound in its free basic state by carrying out the polymerization in 1:2-dichlorethane at temperature between 40 and 95° C. the basic polymerizable compound being present in a major amount of the total amount of the polymerizable compounds.

References Cited by the Examiner

UNITED STATES PATENTS

| 2,138,763 | 11/38 | Graves | 260—89.7 |
| 2,231,905 | 2/41 | Hanford et al. | 260—89.7 |
| 2,311,548 | 2/43 | Jacobson et al. | 260—89.7 |
| 2,560,251 | 7/51 | Sargent | 260—88.3 |
| 2,595,907 | 5/52 | Thomas et al. | 260—89.7 |
| 2,601,251 | 6/52 | Bruson | 260—89.7 |
| 2,606,175 | 8/52 | Price | 260—88.3 |
| 2,897,200 | 7/59 | Maeder | 260—89.7 |
| 2,945,013 | 7/60 | Ott | 260—80.5 |
| 3,026,250 | 3/62 | Coyner | 260—33.8 |

JOSEPH L. SCHOFER, *Primary Examiner.*

MILTON STERMAN, P. E. MANGAN, J. R. LIBERMAN, LEON J. BERCOVITZ, *Examiners.*